US010759955B2

(12) United States Patent
Taniguchi et al.

(10) Patent No.: US 10,759,955 B2
(45) Date of Patent: Sep. 1, 2020

(54) WATER-BASED INK FOR INK-JET RECORDING

(71) Applicant: Brother Kogyo Kabushiki Kaisha, Nagoya-shi, Aichi-ken (JP)

(72) Inventors: Akihiko Taniguchi, Kakamigahara (JP); Hiroyuki Tanaka, Inazawa (JP); Takefumi Kawakami, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/286,214

(22) Filed: Feb. 26, 2019

(65) Prior Publication Data

US 2019/0300734 A1    Oct. 3, 2019

(30) Foreign Application Priority Data

Mar. 30, 2018  (JP) ................. 2018-070303

(51) Int. Cl.
| | |
|---|---|
| *C09D 11/324* | (2014.01) |
| *C09D 11/322* | (2014.01) |
| *C09D 11/40* | (2014.01) |

(52) U.S. Cl.
CPC .......... *C09D 11/324* (2013.01); *C09D 11/322* (2013.01); *C09D 11/40* (2013.01)

(58) Field of Classification Search
CPC ..... C09D 11/30; C09D 11/322; C09D 11/324; C09D 11/40
See application file for complete search history.

(56) References Cited

U.S. PATENT DOCUMENTS

| | | | |
|---|---|---|---|
| 5,609,671 A | 3/1997 | Nagasawa | |
| 5,803,958 A * | 9/1998 | Katsen | C09D 11/322 106/31.65 |
| 5,837,045 A | 11/1998 | Johnson et al. | |
| 6,726,758 B2 * | 4/2004 | Sano | C09D 11/324 106/31.6 |
| 7,452,415 B2 * | 11/2008 | Doumaux | C09D 11/322 106/31.6 |
| 8,016,404 B2 | 9/2011 | Kato et al. | |
| 9,127,179 B1 * | 9/2015 | Hasegawa | C09D 11/324 |
| 9,434,848 B1 * | 9/2016 | Breton | B41J 2/21 |

(Continued)

FOREIGN PATENT DOCUMENTS

| | | |
|---|---|---|
| JP | H08-3498 A | 1/1996 |
| JP | 2000-513396 A | 10/2000 |

(Continued)

OTHER PUBLICATIONS

English Machine Translation of JP 2009-132766 (Year: 2009).*

*Primary Examiner* — Helene Klemanski
(74) *Attorney, Agent, or Firm* — Banner & Witcoff, Ltd.

(57) ABSTRACT

There is provided a water-based ink for ink-jet recording including: a self-dispersible black pigment; a resin-dispersed chromatic pigment including a resin-dispersed magenta pigment and a resin-dispersed cyan pigment; and water. A ratio (Col/Bk) of a solid content mass (Col) of the resin-dispersed chromatic pigment to a solid content mass (Bk) of the self-dispersible black pigment is in a range of 0.24 to 0.73 and a mean particle diameter of the self-dispersible black pigment is greater than a mean particle diameter of the resin-dispersed chromatic pigment.

10 Claims, 2 Drawing Sheets

(56) References Cited

U.S. PATENT DOCUMENTS

| | | | |
|---|---|---|---|
| 2006/0089421 A1 | 4/2006 | Vasudevan | |
| 2006/0089422 A1* | 4/2006 | Vasudevan | C09B 68/20 |
| | | | 523/160 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0207805 A1* | 8/2008 | Blease | C09D 11/324 |
| | | | 524/145 |
| 2008/0241398 A1 | 10/2008 | Kato et al. | |
| 2009/0167824 A1* | 7/2009 | Szajewski | C08G 18/755 |
| | | | 347/84 |
| 2009/0229489 A1 | 9/2009 | Gu | |
| 2012/0050390 A1* | 3/2012 | Nishimura | C08K 3/04 |
| | | | 347/21 |
| 2012/0076951 A1* | 3/2012 | Tojo | C09D 11/324 |
| | | | 427/595 |
| 2014/0210918 A1* | 7/2014 | Kumagai | C09D 11/40 |
| | | | 347/100 |
| 2017/0267890 A1* | 9/2017 | Tsuzaka | C09D 11/40 |

FOREIGN PATENT DOCUMENTS

| | | | |
|---|---|---|---|
| JP | 2006-176756 A | | 7/2006 |
| JP | 2008-524400 A | | 7/2008 |
| JP | 2008-246821 A | | 10/2008 |
| JP | 2009-515007 A | | 4/2009 |
| JP | 2009132766 A | * | 6/2009 |
| JP | 2011-515535 A | | 5/2011 |
| JP | 2012-31272 A | | 2/2012 |

\* cited by examiner

WATER-BASED INK FOR INK-JET RECORDING

CROSS REFERENCE TO RELATED APPLICATION

The present application claims priority from Japanese Patent Application No. 2018-070303 filed on Mar. 30, 2018 the disclosure of which is incorporated herein by reference in its entirety.

BACKGROUND

Field of the Invention

The present invention relates to a water-based ink for ink-jet recording.

Description of the Related Art

In a water-based ink for ink-jet recording (hereinafter referred to also as a "water-based ink" or an "ink" in some cases), a pigment is widely used as a colorant. In the water-based ink using the pigment, however, the particles of the pigment often sediment (settle) as time passes. The sedimentation of the pigment particles causes a problem(s) such as the increase in the viscosity of the water-based ink in the vicinity of nozzles of an ink-jet head, any unsatisfactory jetting (discharge), any non-uniform density or concentration in the water-based ink, etc.

As a solution to the above-described problem(s), there is proposed a self-dispersible dye-pigment containing a pigment, a polymer covalently bonded to the pigment, a dye bonded to the polymer, and a dispersant covalently bonded to at least one of the pigment, the polymer and the dye (see, for example, Japanese Patent Application Laid-open No. 2006-176756 corresponding to U.S. Patent Application Publication Nos. US2006/0089421 and US2006/0089422).

There is, however, a demand for a water-based ink for ink-jet recording which is capable of suppressing the sedimentation of self-dispersible black pigment, and which has a liquid color close to that of a water-based ink containing only the self-dispersible black pigment.

In view of the above-described situation, an object of the present teaching is to provide a water-based ink for ink-jet recording which is capable of suppressing the sedimentation of self-dispersible black pigment, and which has a liquid color close to that of a water-based ink containing only the self-dispersible black pigment.

According to an aspect of the present teaching, there is provided a water-based ink for ink-jet recording including:

a self-dispersible black pigment;

a resin-dispersed chromatic pigment including a resin-dispersed magenta pigment and a resin-dispersed cyan pigment; and water, wherein a ratio (Col/Bk) of a solid content mass (Col) of the resin-dispersed chromatic pigment to a solid content mass (Bk) of the self-dispersible black pigment is in a range of 0.24 to 0.73; and a mean particle diameter of the self-dispersible black pigment is greater than a mean particle diameter of the resin-dispersed chromatic pigment.

BRIEF DESCRIPTION OF THE DRAWINGS

FIG. 1 is a graph indicating, on a plane, "a*" and "b*" of each of:

0.002% by mass aqueous dispersion (water dispersion) of a carbon black usable as a material of a self-dispersible black pigment;

0.004% by mass aqueous dispersion of C.I. Pigment Red 122 (P.R. 122, M) usable as a material of a resin-dispersed magenta pigment;

0.002% by mass aqueous dispersion of C.I. Pigment Blue 15:3 (P.B. 15:3, C) usable as a material of a resin-dispersed cyan pigment;

0.002% by mass aqueous dispersion of C.I. Pigment Yellow 74 (P.Y. 74, Y) usable as a material of a resin-dispersed yellow pigment;

aqueous dispersion (M+C) in which the mass ratio (M:C) between the resin-dispersed magenta pigment (M) and the resin-dispersed cyan pigment (C) is M:C=1:7; and aqueous dispersion (Y+M+C) in which the mass ratio (Y:M:C) among the resin-dispersed yellow pigment (Y), the resin-dispersed magenta pigment (M) and the resin-dispersed cyan pigment (C) is Y:M:C=1:3:2.

Figure 2:
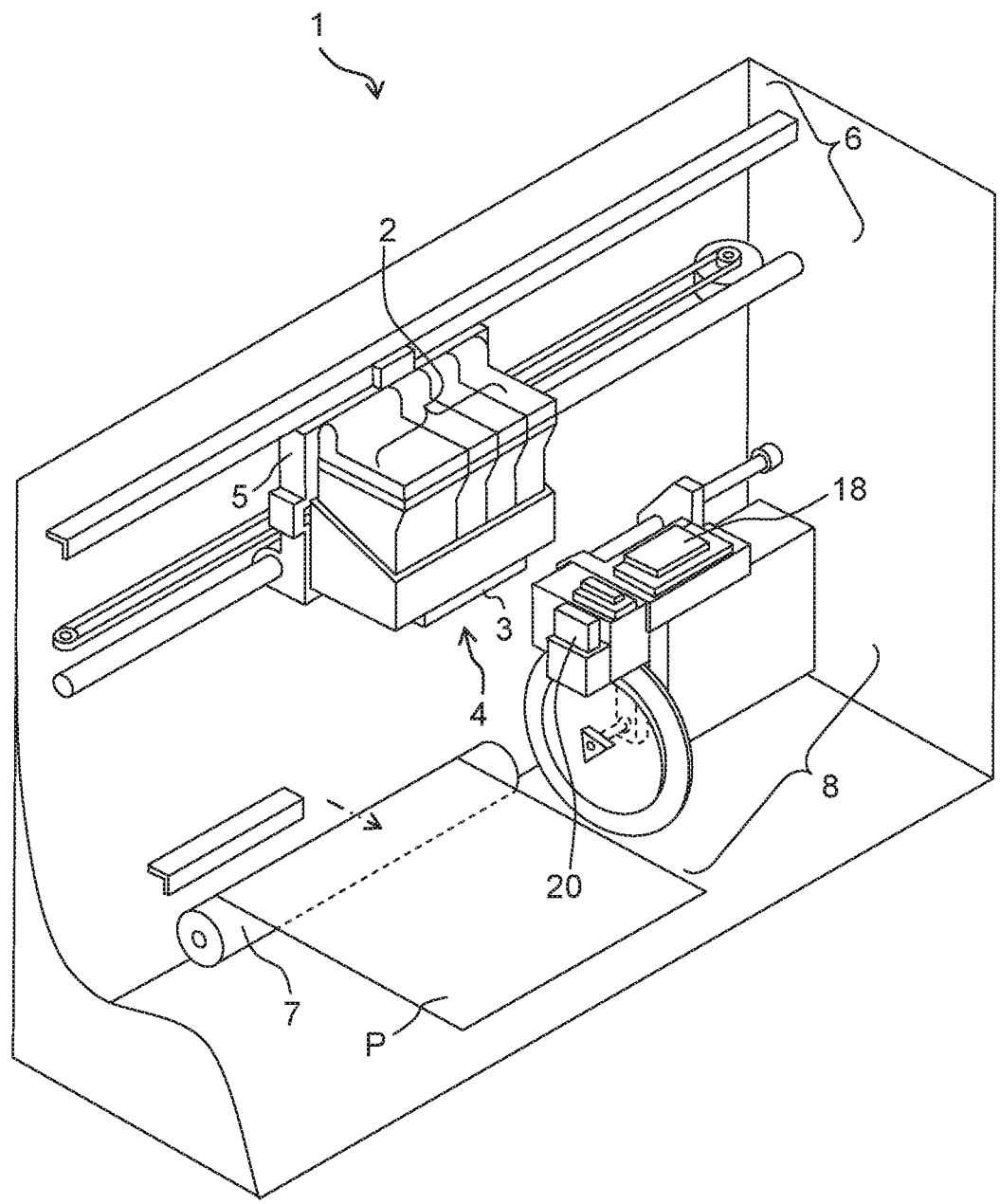

FIG. 2 is a schematic perspective view depicting the configuration of an example of an ink-jet recording apparatus related to the present teaching.

DESCRIPTION OF EMBODIMENTS

In the present teaching, the term "re-dispersion property" of the water-based ink means, for example, solubility or dispersion property of a solid matter, in a water-based ink, generated after the water-based ink is once evaporated to dryness with resultant solid matter, the solubility or dispersion property being those of when the solid matter is then newly brought into contact with the water-based ink. In a case that the re-dispersion property is not satisfactory, for example, the following situation might arise: namely, the water-based ink is heated by an ink-jet head, which in turn causes the water-based ink to be evaporated to dryness with resultant solid matter; afterwards, even when the solid matter is newly brought into contact with the water-based ink, the solid matter does not dissolve or disperse, thereby causing any unsatisfactory jetting (discharge).

An explanation will be given about a water-based ink related to the present teaching. The water-based ink related to the present teaching includes a self-dispersible black pigment, a resin-dispersed chromatic pigment and water.

The self-dispersible black pigment is dispersible in water without using any dispersing agent, for example, owing to the fact that at least one of the hydrophilic functional group and the salt thereof including, for example, a carbonyl group, a hydroxyl group, a carboxylic acid group, a sulfonic acid group, and a phosphate group is introduced into the surfaces of the black pigment particles (such as particles of carbon black) by the chemical bond directly or with any group intervening therebetween. As the self-dispersible black pigment, it is possible to use a self-dispersible black pigment in which the carbon black is subjected to a treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to U.S. Patent Application Publication No. US2006/0201380, Published Japanese Translation of PCT International Publication for Patent Application No. 2009-515007 corresponding to U.S. Patent Application Publication No. US2007/0100023 and U.S. Patent Application Publication No. US2007/0100024, Published Japanese Translation of PCT International Publication for Patent Application No. 2011-515535 corresponding to U.S. Patent Application Publication No. US2009/0229489, etc. The carbon black, which is suitable to have the surface treatment performed therefor, includes, for example, carbon blacks such as "MA8", "MA100" and "#2650" produced by MITSUBISHI CHEMICAL CORPORATION, etc. As the self-dispersible black pigment, it is allowable to use, for example, any commercially available product. The commercially available product includes, for example, "CAB-O-JET (trade name) 200", "CAB-O-JET (trade name) 300", and "CAB-O-JET (trade name) 400" produced by CABOT CORPORATION; "BONJET (trade name) BLACK CW-2", and "BONJET (trade name) BLACK CW-3" produced by ORIENT CHEMICAL INDUSTRIES, LTD.; and "LIOJET (trade name) WD BLACK 002C" produced by TOYO INK MFG. CO., LTD. It is allowable that only one kind of the self-dispersible black pigment as described above is used singly, or two or more kinds of the self-dispersible black pigment are used in combination.

The resin-dispersed chromatic pigment (resin-dispersible pigment, resin dispersion type pigment) is dispersible in water by, for example, a pigment-dispersing resin (resin dispersant). As the resin dispersant, it is allowable to use a general resin dispersant. The resin-dispersed chromatic pigment may be obtained by using a resin dispersant so as to allow the resin to be physically adsorbed to the surface of a chromatic pigment, thereby coating the surface of the chromatic pigment with the resin, or may be obtained by allowing an organic group including the resin to be chemically bonded to the surface of the chromatic pigment, thereby coating the surface of the chromatic pigment with the resin. Alternatively, the resin-dispersed chromatic pigment may be encapsulated by the resin dispersant so as to coat the surface of the chromatic pigment with the resin. However, in view of suppressing the sedimentation of the self-dispersible black pigment, the resin-dispersed pigment is preferably a pigment which is not encapsulated by the resin dispersant. A resin dispersant not encapsulating the pigment spreads in the water-based ink more broadly (widely) as compared with a resin dispersant encapsulating the pigment. This is presumed to realize further suppression of the sedimentation of the self-dispersible black pigment.

The resin-dispersed chromatic pigment includes a resin-dispersed magenta pigment and a resin-dispersed cyan pigment. A density (specific gravity) of the resin-dispersed magenta pigment is smaller than that of the resin-dispersed cyan pigment. Therefore, the resin-dispersed chromatic pigment including the resin-dispersed magenta pigment and the resin-dispersed cyan pigment further realizes suppression of the sedimentation of the self-dispersible black pigment as compared with a case of including only the resin-dispersed cyan pigment.

The resin-dispersed magenta pigment is exemplified, for example, by C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violet 19, 196; a solid solution containing at least two kinds of these pigments; etc. It is allowable that only one kind of the resin-dispersed magenta pigment as described above is used singly, or two or more kinds of the resin-dispersed magenta pigment are used in combination.

The resin-dispersed cyan pigment is exemplified, for example, by C. I. Pigment Blues 1, 2, 3, 15, 15:1, 15:2, 15:3, 15:4, 16, 22, and 60; a solid solution containing at least two kinds of these pigments; etc. It is allowable that only one kind of the resin-dispersed cyan pigment as described above is used singly, or two or more kinds of the resin-dispersed cyan pigment are used in combination.

As described above, it is allowable to use, as a the pigment-dispersing resin or the resin for dispersing pigment (resin dispersant), any pigment-dispersing resin of a general type, such as those exemplified by: proteins such as gelatin, albumin, casein, etc.; natural rubbers such as gum arabic, gum traganth, etc.; glucosides such as saponin, etc.; naturally-occurring polymers such as lignin sulfonate, shellac, etc.; anionic polymers such as acrylic acid-acrylic acid ester copolymer and salt thereof, polyacrylate, polymethacrylate, salt of styrene-acrylic acid copolymer, salt of vinylnaphthalene-acrylic acid copolymer, salt of styrene-maleic acid copolymer, salt of maleic acid-maleic anhydride copolymer, salt of vinylnaphthalene-maleic acid copolymer, sodium salt of β-naphthalenesulfonic acid formalin condensate, orthophosphate, etc.; nonionic polymers such as polyvinyl alcohol, polyvinyl pyrrolidone, etc.; and the like.

The content amount of the pigment-dispersing resin (resin dispersant) with respect to the entire amount of the water-based ink is not particularly limited, and can be determined appropriately in accordance with the kind of the resin-dispersed chromatic pigment, the pigment solid content mass of the resin-dispersed chromatic pigment, etc. The ratio of the solid content mass of the resin dispersant with respect to the pigment solid content mass of the resin-dispersed chromatic pigment in the water-based ink is, for example, in a range of 0.05 to 5.0 or in a range of 0.1 to 1.0.

The water-based ink related to the present teaching may further include another resin which is different from the resin dispersant for the resin-dispersed chromatic pigment, for the purpose of further suppressing the sedimentation. The content amount of the other resin which is different from the resin dispersant in the entire amount of the water-based ink is, for example, in a range of 2% by mass to 3% by mass. From the viewpoint of suppressing any increase in the viscosity after the evaporation in the water-based ink, it is preferred that the content amount of the another resin which is different from the resin dispersant is, for example, not more than 10% by mass.

As described above, the ratio (Bk:Col) of (between) a solid content mass (Bk) of the self-dispersible black pigment and a solid content mass (Col) of the resin-dispersed chromatic pigment in the entire amount of the water-based ink is in a range of Bk:Col=1:0.24 to 1:0.73. Namely, a ratio (Col/Bk) of the solid content mass (Col) of the resin-dispersed chromatic pigment to the solid content mass (Bk) of the self-dispersible black pigment is in a range of Col/Bk=0.24 to 0.73. By allowing the ratio (Bk:Col) to be in the range of Bk:Col=1:0.24 to 1:0.73, it is possible to obtain a water-based ink having a liquid color close to that of a water-based ink containing only the self-dispersible black pigment. The ratio Bk:Col may be, for example, Bk:Col=1: 0.34 to 1:0.62 ((Col/Bk)=0.34 to 0.62). By allowing the ratio (Bk:Col) to be Bk:Col=1:0.34 to 1:0.62, it is possible to obtain a water-based ink which is more effective in suppressing the sedimentation of the self-dispersible black pigment.

It is allowable that the solid content mass (Bk) and the solid content mass (C) are appropriately adjusted such that the ratio (Bk:Col) is within the range of Bk:Col=1:0.24 to 1:0.73; the solid content mass (Bk) is, for example, in a range of 0.5% by mass to 10% by mass, in a range of 2% by mass to 8% by mass, or in a range of 3% by mass to 7% by mass; and the solid content mass (Col) is, for example, in a range of 0.1% by mass to 5% by mass, in a range of 0.2% by mass to 4% by mass, or in a range of 0.3% by mass to 3% by mass. In a case that the solid content mass (Bk) and the solid content mass (C) become to be great, the viscosity of the water-based ink becomes higher. Although the effect of suppressing the sedimentation of the self-dispersible black pigment becomes high in a case that the viscosity of the water-based ink is high, any excessively high viscosity makes the jetting (discharge) of the water-based ink from the ink-jet head to be difficult. From these viewpoints, it is preferred to make the solid content mass (Bk) and the solid content mass (Col) to be within the above-described ranges therefor, respectively.

It is preferred that the ratio (M:C) between the solid content mass (M) of the resin-dispersed magenta pigment and the solid content mass (C) of the resin-dispersed cyan pigment in the entire amount of the water-based ink is adjusted such that the hue angle of the aqueous dispersion of the resin-dispersed magenta pigment and the resin-dispersed cyan pigment is within a range of 180° to 270°. Namely, a ratio (C/M) of the solid content mass (C) of the resin-dispersed cyan pigment to the solid content mass (M) of the resin-dispersed magenta pigment in the entire amount of the water-based ink is preferably determined such that the hue angle, of the resin-dispersed chromatic pigment including the resin-dispersed cyan pigment and the resin-dispersed magenta pigment, is allowed to be within the range of 180° to 270°. The ratio (C/M) is, for example, within a range of 1 to 20 or in a range of 5 to 1.

Note that in the present teaching, the term "hue angle" represents, for example, an angle in the L*a*b* color system chromaticity diagram indicating a* and b* on the plane, and is defined as follows:

In $a^* \geq 0$, $b^* \geq 0$ (first quadrant), the hue angle=$\tan^{-1}(b^*/a^*)$;

In $a^* \leq 0$, $b^* \geq 0$ (second quadrant), the hue angle=$180° + \tan^{-1}(b^*/a^*)$;

In $a^* \leq 0$, $b^* \leq 0$ (third quadrant), the hue angle=$180° + \tan^{-1}(b^*/a^*)$; and In $a^* \geq 0$, $b^* \leq 0$ (fourth quadrant), the hue angle=$360° + \tan^{-1}(b^*/a^*)$.

In the present teaching, the hue angle of the resin-dispersed chromatic pigment can be calculated, for example, using 0.002% by mass to 0.004% by mass aqueous dispersion of the resin-dispersed chromatic pigment as follows: namely, color measurement is performed therefor using a spectrophotometer UV 3600 manufactured by SHIMADZU CORPORATION, with a measuring cell having a cell length of 10 mm and pure water (purified water) as the reference, to thereby obtain the L* value, the a* value and b* value for the above-described aqueous dispersion; and the hue angle can be calculated from the a* value and b* value among the L* value, the a* value and b* value, in accordance with the above-described definitional expression of the hue angle. Note that each of the L* value, the a* value and b* value is based on the L*a*b color system (CIE 1976 (L*a*b*) color system) normalized in 1976 by Commission Internationale d'Eclairage (CIE) (see JIS Z 8729). The hue angle of the self-dispersible black pigment can be calculated in a similar method as that of the resin-dispersed chromatic pigment.

TABLE 1 indicates a* and b* of each of:

0.002% by mass aqueous dispersion (water dispersion) of a carbon black usable as a material of the self-dispersible black pigment, 0.004% by mass aqueous dispersion of C.I. Pigment Red 122 (P.R. 122, M) usable as a material of the resin-dispersed magenta pigment, 0.002% by mass aqueous dispersion of C.I. Pigment Blue 15:3 (P.B. 15:3, C) usable as a material of the resin-dispersed cyan pigment, 0.002% by mass aqueous dispersion of C.I. Pigment Yellow 74 (P.Y. 74, Y) usable as a material of a resin-dispersed yellow pigment (to be described later on), aqueous dispersion (M+C) in which the mass ratio (M:C) of the resin-dispersed magenta pigment (M) and the resin-dispersed cyan pigment (C) is M:C=1:7, and aqueous dispersion (Y+M+C) in which the mass ratio (Y:M:C) of the resin-dispersed yellow pigment (Y), the resin-dispersed magenta pigment (M) and the resin-dispersed cyan pigment (C) is Y:M:C=1:3:2.

Figure 1:
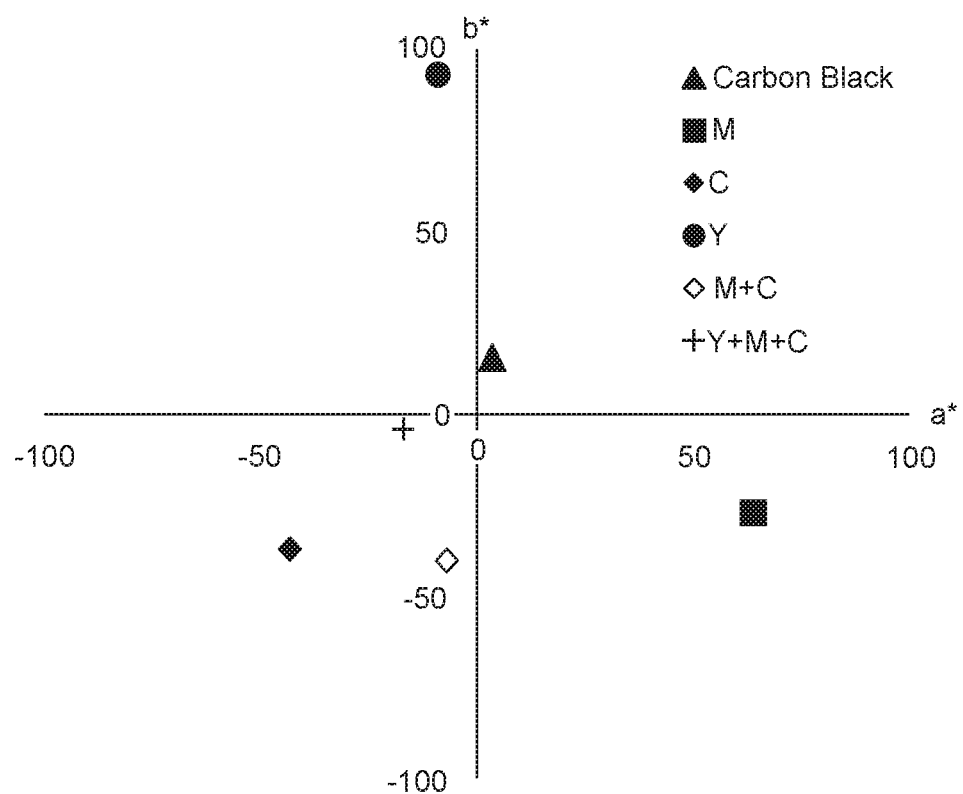

Further, a graph indicating the a* and b* of each of these aqueous solutions on a plane is depicted in FIG. 1. Note that each of the mean particle diameters (average particle sizes) in TABLE 1 can be calculated, for example, by performing dilution such that the solid content mass is in a range of 0.02% by mass to 0.04% by mass and by performing measurement using a dynamic light scattering particle diameter distribution measuring apparatus "LB-550" manufactured by HORIBA, LTD., with the intensity of scattered light as the reference for the mean particle diameter. This is also applicable similarly to those described later on. Here, the "mean particle diameter (average particle size)" means an average particle diameter (average particle size) of secondary particles rather than primary particles; and the "secondary particle" means a particle which is formed by an aggregation of the primary particles. This is also applicable similarly to those described later on.

TABLE 1

|  | Carbon Black | M P.R. 122 | C P.B. 15:3 | Y P.Y. 74 | M + C 1:7 | Y + M + C 1:3:2 |
| --- | --- | --- | --- | --- | --- | --- |
| Mean particle diameter | 155 nm | 125 nm | 104 nm | 105 nm | — | — |
| a* | 4 | 64 | −43 | −9 | −7 | −17 |
| b* | 16 | −27 | −37 | 93 | −40 | −4 |

In FIG. 1, aqueous dispersions of pigments which are positioned relative to each other in point symmetrical positions, with the origin (a*=0, b*=0) as the center, have a relationship of complementary color. In FIG. 1, the aqueous dispersion of the carbon black which is usable as the material of the self-dispersible black pigment and the aqueous dispersion, including P.R. 122 and P.B. 15:3 with the mass ratio (M:C) of 1:7, are located at positions which are closely in the point symmetry relative to each other, with the origin (a*=0, b*=0) as the center. Namely, the carbon black and the chromatic pigment containing P.R. 122 and P.B. 15:3 which are used in these aqueous dispersions, respectively, have the relationship of complementary color. The water-based ink using theses pigments achieves, for example, the following effect. Namely, the water-based ink of the present teaching is capable of having a liquid color close to that of a water-based ink containing only the self-dispersible black pigment. Further, by adding the resin-dispersed chromatic pigment which has the relationship of complementary color with the self-dispersible black pigment, the chromaticness C* of the water-based ink of the present teaching becomes small. This is a preferred characteristic as an achromatic water-based ink such as a water-based black ink.

From the viewpoint of making the chromaticness C* of the water-based ink to be small, the hue angle of the self-dispersible black pigment is, for example, preferably in a range of 0° to 90°, or in a range of 30° to 90°. From a similar viewpoint, the hue angle of the resin-dispersed chromatic pigment is, for example, preferably in a range of 180° to 270°, or in a range of 210° to 270°.

As described above, the mean particle diameter of the self-dispersible black pigment is greater than the mean particle diameter of the resin-dispersed chromatic pigment. Accordingly, for example in water, the sedimentation velocity of the resin-dispersed chromatic pigment is slower than sedimentation velocity of the self-dispersible black pigment. Namely, the resin-dispersed chromatic pigment is harder (less likely) to sediment than the self-dispersible black pigment in the water-based ink. With this, it is presumed that for example in the above-described water-based ink, the sedimentation of the self-dispersible black pigment is hindered by the resin-dispersed chromatic pigment, and thus the sedimentation of the self-dispersible black pigment is suppressed. Note that in a case of using a self-dispersible chromatic pigment or a dye, instead of using the resin-dispersed chromatic pigment, it is not possible to obtain the effect of suppressing the sedimentation of the self-dispersible black pigment. The reason for this assumed as follows. Namely, the steric hindrance which occurs in the resin-dispersed chromatic pigment does not easily occur in the self-dispersible chromatic pigment, and thus the sedimentation of the self-dispersible black pigment cannot be easily suppressed. With the dye, since the dye dissolves in water, and thus the sedimentation of the self-dispersible black pigment cannot be easily suppressed. This mechanism, however, is merely a presumption, and the present teaching is not limited to or restricted by this presumed mechanism.

The mean particle diameter (average particle size) of the self-dispersible black pigment is, for example, in a range of 1.05 times to 2.00 times, in a range of 1.07 times to 1.75 time, or in a range of 1.08 times to 1.49 times the mean particle diameter (average particle size) of the resin-dispersed chromatic pigment. Further, the difference between the mean particle diameter of the self-dispersible black pigment and the mean particle diameter of the resin-dispersed chromatic pigment is, for example, in a range of 5 nm to 100 nm, in a range of 7 nm to 70 nm, or in a range of 9 nm to 51 nm. The mean particle diameter of the self-dispersible black pigment is, for example, in a range of 135 nm to 210 nm, in a range of 135 nm to 175 nm, in a range of 135 nm to 155 nm, or not less than 150 nm. The mean particle diameter of the resin-dispersed chromatic pigment is, for example, in a range of 80 nm to 150 nm, in a range of 100 nm to 126 nm, or in a range of 104 nm to 125 nm. In a case that the resin-dispersed chromatic pigment is composed of a plurality of kinds of resin-dispersed pigments having different mean particle diameters, it is allowable to calculate the mean particle diameter of the resin-dispersed chromatic pigment from the mean particle diameters of the respective resin-dispersed pigments as components composing the resin-dispersed chromatic pigment. For example, in a case of the resin-dispersed chromatic pigment which is indicated in TABLE 1 and which includes the resin-dispersed magenta pigment (P. R. 122, M) and the resin-dispersed cyan pigment (P. B. 15:3, C) at the mass ratio (M:C)=1:7, it is allowable to perform calculation as follows:

$$125x(\tfrac{1}{8})+104x(\tfrac{7}{8})=\text{approximately } 107 \text{ nm}.$$

For example, the density of the self-dispersible black pigment may be higher than the density of the resin-dispersed chromatic pigment. For example, the density of the self-dispersible black pigment is in a range of 1.05 times to 1.88 times, in a range of 1.07 times to 1.78 times, or in a range of 1.11 times to 1.58 times the density of the resin-dispersed chromatic pigment. Further, for example, the difference between the density of the self-dispersible black pigment and the density of the resin-dispersed chromatic pigment is in a range of 0.18 g/cm³ to 0.77 g/cm³, or in a range of 0.25 g/cm³ to 0.55 g/cm³. The density of the self-dispersible black pigment is, for example, in a range of 1.8 g/cm³ to 2.1 g/cm³. The density of the resin-dispersed chromatic pigment is, for example, in a range of 1.3 g/cm³ to 1.6 g/cm³. In a case that the resin-dispersed chromatic pigment is composed of a plurality of kinds of resin-dispersed pigments having different densities, it is allowable to calculate the density of the resin-dispersed chromatic pigment from the densities of the respective resin-dispersed pigments as the components composing the resin-dispersed chromatic pigment. For example, it is allowable to perform calculation of the density of the resin-dispersed chromatic pigment in a similar method as in the calculation of the mean particle diameter of the resin-dispersed chromatic pigment as described above.

The resin-dispersed chromatic pigment may further include a resin-dispersed yellow pigment. The resin-dispersed yellow pigment includes, for example, C.I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; a solid solution containing at least two kinds of these pigments; etc. It is allowable that only one kind of the resin-dispersed yellow pigment as described above is used singly, or two or more kinds of the resin-dispersed yellow pigment are used in combination.

It is preferred that the ratio (Y:M:C) among the solid content mass (Y) of the resin-dispersed yellow pigment, the solid content mass (M) of the resin-dispersed magenta pigment and the solid content mass (C) of the resin-dispersed cyan pigment (C) in the entire amount of the water-based ink is adjusted such that the hue angle of the aqueous dispersion of the resin-dispersed yellow pigment, the resin-dispersed magenta pigment and the resin-dispersed cyan pigment is within a range of 180° to 270°. Namely, the ratio (Y:C:M) is preferably determined such that the hue angle, of the resin-dispersed chromatic pigment including the resin-dispersed yellow pigment, the resin-dispersed cyan pigment and the resin-dispersed magenta pigment at the above-described rate (Y:M:C), is allowed to be within the range of 180° to 270°.

It is allowable that the resin-dispersed chromatic pigment is composed only of the resin-dispersed magenta pigment and the resin-dispersed cyan pigment; or that the resin-dispersed chromatic pigment is composed only of the resin-dispersed magenta pigment, the resin-dispersed cyan pigment and the resin-dispersed yellow pigment. Further, the resin-dispersed chromatic pigment may contain a pigment of which color is different from the yellow, magenta and cyan, within a range not adversely affecting the color of ink (desired hue angle, etc.). A ratio of the sum (M+C) of the solid content mass (M) of the resin-dispersed magenta pigment and the solid content mass (C) of the resin-dispersed cyan pigment, or a ratio of the sum (Y+M+C) of the solid content mass (Y) of the resin-dispersed yellow pigment, the solid content mass (M) of the resin-dispersed magenta pigment and the solid content mass (C) of the resin-dispersed cyan pigment, with respect to the entire solid content mass of the resin-dispersed chromatic pigment is, for example, in a range of 90% by mass to 100% by mass.

As described above, in FIG. 1, aqueous dispersions of pigments which are positioned relative to each other in point symmetrical positions, with the origin ($a^*=0$, $b^*=0$) as the center, have a relationship of complementary color. Accordingly, in FIG. 1, the aqueous dispersion of the carbon black which is usable as the material of the self-dispersible black pigment and the aqueous dispersion (Y+M+C), containing P.Y. 74, P.R. 122 and P.B. 15:3 at the mass ratio (Y:M:C) of 1:3:2, are located at positions which are closely to be in the point symmetry relative to each other, with the origin ($a^*=0$, $b^*=0$) as the center. Namely, the carbon black and the chromatic pigment containing P.Y. 74, P.R. 122 and P.B. 15:3 which are used in these aqueous dispersions, respectively, have the relationship of complementary color. The water-based ink using theses pigments achieves, for example, the following effect. Namely, the water-based ink of the present teaching is capable of having a liquid color close to that of a water-based ink containing only the self-dispersible black pigment. Further, by adding the resin-dispersed chromatic pigment which has the relationship of complementary color with the self-dispersible black pigment, the chromaticness $C^*$ of the water-based ink of the present teaching becomes small. This is a preferred characteristic as an achromatic water-based ink such as a water-based black ink.

The water is preferably ion-exchange water or purified water (pure water). The content amount of the water with respect to the entire amount of the water-based ink is, for example, in a range of 10% by mass to 90% by mass, in a range of 40% by mass to 80% by mass, or in a range of 50% by mass to 80% by mass. The content amount of the water with respect to the entire amount of the water-based ink may be, for example, a balance of the other components.

The water-based ink may further contain a water-soluble organic solvent. The water-soluble organic solvent is exemplified, for example, by a humectant which prevents the water-based ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination.

Among the above-described humectants, the humectant is preferably a polyvalent alcohol such as alkylene glycol, glycerol, etc.

The content amount of the humectant in the entire amount of the water-based ink is, for example, in a range of 0% by mass to 95% by mass, in a range of 5% by mass to 80% by mass, or in a range of 5% by mass to 50% by mass.

The penetrant is not particularly limited, and is exemplified, for example, by glycol ether. The glycol ether is not particularly limited, and is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One type of the penetrant may be used singly, or two or more kinds of the penetrant may be used in combination.

The content amount of the penetrant in the entire amount of the water-based ink is, for example, in a range of 0% by mass to 20% by mass, in a range of 0% by mass to 15% by mass, or in a range of 1% by mass to 6% by mass.

The water-based ink may further contain a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing the self-dispersible black pigment, the resin-dispersed magenta pigment, the resin-dispersed cyan pigment, the water, and an optionally another additive(s) as necessary, by a conventionally known method, and then removing any non-dissolved matter, etc., with a filter, etc.

As explained above, according to the present teaching, it is possible to provide a water-based ink for ink-jet recording which is capable of suppressing the sedimentation of self-dispersible black pigment and which has a liquid color close to that of a water-based ink containing only the self-dispersible black pigment, by using, in combination, the self-dispersible black pigment and the resin-dispersed chromatic pigment under a predetermined condition.

Next, explanation will be given about an ink-jet recording apparatus related to the present teaching.

The ink-jet recording apparatus related to the present teaching is an ink-jet recording apparatus characterized by including: an ink accommodating section; and an ink discharge mechanism configured to discharge an ink accommodated in the ink accommodating section; wherein the water-based ink for ink-jet recording related to the present teaching is accommodated in the ink accommodating section.

FIG. 2 depicts the configuration of an example of the ink-jet recording apparatus related to the present teaching. As depicted in FIG. 2, an ink-jet recording apparatus 1 related to the present teaching includes four ink cartridges (ink containers) 2, an ink discharge mechanism (ink-jet head) 3, a head unit 4, a carriage 5, a driving unit 6, a platen roller 7 and a purge device 8 as main constitutive components or parts.

The four ink cartridges 2 contain water-based inks of four colors, respectively, the four colors being yellow, magenta, cyan and black. For example, the water-based black ink is the water-based ink for ink-jet recording related to the present teaching. In this example, a set of the four ink cartridges 2 is described. However, it is allowable to use an integrated ink cartridge of which interior (inner part) is partitioned so as to form an accommodating section for the water-based yellow ink, an accommodating section for the water-based magenta ink, an accommodating section for the water-based cyan ink and an accommodating section for the water-based black ink, instead of using the set of the four ink cartridges 2. As the body of the ink cartridge, it is possible to use, for example, a publicly or conventionally known body.

The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (see, for example, Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 2, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use, as the ink containers, four ink bottles having a bottle shape, instead of using the four ink cartridges 2. In such a case, it is preferred that each of the ink bottles is provided with an inlet port via which the ink is poured from the outside to the inside of the ink bottle.

Ink-jet recording using the ink-jet recording apparatus 1 is performed, for example, in the following manner Namely, at first, a recording medium P is supplied or fed, for example, from a paper sheet feeding cassette or sheet feeding cassette (not depicted in the drawing) arranged at a side of or at a position below the ink-jet recording apparatus 1. The recording medium P is introduced or guided between the ink-jet head 3 and the platen roller 7. Then, a predetermined recording is performed on the fed or introduced recording medium P with the water-based ink(s) discharged or jetted from the ink-jet head 3. According to the present teaching, the sedimentation of the pigment is suppressed, and thus any discharge failure (jetting failure) in the ink-jet head 3 is suppressed. The recording medium P after the recording is discharged from the ink-jet recording apparatus 1. According to the present teaching, it is possible to obtain a recorded matter in which the black color is close to an achromatic color obtained in a case of using a water-based ink containing only the self-dispersible black pigment, and in which the non-uniform density is suppressed. In FIG. 2, the medium feeding mechanism and medium discharge mechanism for the recording medium P are omitted in the drawing.

In the apparatus depicted in FIG. 2, an ink-jet head of serial type (serial type ink-jet head) is adopted. However, the present teaching is not limited to this. The ink-jet recording apparatus may be an apparatus adopting an ink-jet head of line type (line type ink-jet head).

Next, an ink-jet recording method related to the present teaching is an ink-jet recording method characterized by including: performing recording on a recording medium by jetting (discharging), to the recording medium, a water-based ink by an ink-jet system; and using the water-based ink for ink-jet recording related to the present teaching, as the water-based ink. The recording includes printing a letter (text), printing an image, printing, etc.

EXAMPLES

Next, examples related to the present teaching will be explained together with comparative examples. Note that the present teaching is not limited to and is not restricted by the examples and the comparative examples which will be described below.

<Preparation of Aqueous Pigment Dispersions 1 to 4>

40 g of Carbon Black "#2650" produced by MITSUBISHI CHEMICAL CORPORATION was mixed with 200 g of ion-exchanged water, followed by being pulverized by a bead mill. The pulverized mixture was added with a carboxyl group agent, followed by being heated and agitated, and subjected to an oxidation processing. The obtained liquid was cleaned with a solvent for several times, was poured into water, and was cleaned again with the water in a repeated manner. Then, the liquid was filtrated with a filter, and thus a water (aqueous) pigment dispersion 1 indicated in TABLE 2 was obtained. The mean particle diameter (average particle size) of the carbon black contained in the aqueous pigment dispersion 1 was measured by using the dynamic light scattering particle diameter distribution measuring apparatus "LB-550" (product name) manufactured by HORIBA, LTD., and the mean particle diameter was 155 nm. Further, aqueous pigment dispersions 2 to 4 indicated in TABLE 2 were obtained in a similar manner regarding the aqueous pigment dispersion 1, except for appropriately changing the kind of pigment and the component rate.

<Preparation of Aqueous Pigment Dispersions 5 to 7>

Pure water (purified water) was added to 20% by mass of a pigment (P.B. 15:3) and 7% by mass of a styrene-acrylic acid copolymer neutralized by sodium hydroxide (acid value: 175 mgKOH/g, molecular weight: 10000) so that the entire amount thereof was 100% by mass, followed by being agitated and mixed, and thus a mixture was obtained. The obtained mixture was placed in a wet sand mill charged with zirconia beads of which diameter was 0.3 mm, and was subjected to a dispersing process for 6 hours. Afterwards, the zirconia beads were removed by a separator, and the mixture was filtrated through a cellulose acetate filter (pore size 3.0 μm). Thus, aqueous pigment dispersion 5 indicated in TABLE 2 was obtained. Note that the styrene-acrylic acid copolymer is a water-soluble polymer which is generally used as a dispersant for pigment (pigment dispersant). Further, aqueous pigment dispersions 6 and 7 indicated in TABLE 2 were obtained in a similar manner as the aqueous pigment dispersion 5, except for appropriately changing the kind of pigment, the component rate and the duration time of dispersing process.

Examples 1 to 10 and Comparative Examples 1 to 8

Components, which were included in Water-based Ink Composition (TABLE 2) and which were different from the aqueous pigment dispersions 1 to 7, were mixed uniformly or homogeneously; and thus an ink solvent was obtained. Subsequently, the ink solvent was added to the aqueous pigment dispersion 1 and to any one of the aqueous pigment dispersion 2 to 7 (in Comparative Example 1, only to the aqueous pigment dispersion 1), followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based ink for ink jet recording of each of Examples 1 to 10 and Comparative Examples 1 to 8 indicated in TABLE 2 was obtained.

With respect to the water-based inks of Examples 1 to 10 and Comparative Examples 1 to 8, respectively, (a) Evaluation of sedimentation, (b) Evaluation of the color (tone, tint) of liquid, and (c) Evaluation of the re-dispersion property were performed by the following methods.

(a) Evaluation of Sedimentation 40 mL of the water-based ink of each of Examples 1 to 10 and Comparative examples 1 to 8 was placed in a 50 mL centrifugal settling tube, and was subjected to a centrifuging processing using a High-speed micro centrifugal CF16RXII and Angle Rotor: T6AP31 manufactured by HITACHI KOKI CO., LTD., under a condition of 6,000 rpm and for 10 minutes. Afterwards, 2 mL of the water-based ink was taken out from a bottom part of the centrifugal settling tube, the viscosity of the water-based ink was measured, and the viscosity increasing rate from the initial viscosity before the centrifuging processing was calculated. The viscosity is a value measured at 25° C. by using a viscometer TVE-25 manufactured by TOM SANGYO CO., LTD.

Note that the viscosity increasing rate in water-based inks in each of which one of the aqueous pigment dispersions 1 to 7 was diluted with water such that the pigment solid content mass became to be 4% by mass (such that the initial viscosity became about 4 mPa·s) was as follows. As the viscosity increasing rate of a water-based ink is lower, it is possible to determine that the sedimentation of the pigment is harder to occur (less likely to occur or hardly occurs) in the water-based ink.

<Viscosity Increasing Rate>

Aqueous pigment dispersion 1 (self-dispersible black pigment): 30%

Aqueous pigment dispersion 2 (self-dispersible P.B. 15:3): 15%

Aqueous pigment dispersion 3 (self-dispersible P.R. 122): 17%

Aqueous pigment dispersion 4 (self-dispersible P.Y. 74): 13%

Aqueous pigment dispersion 5 (resin-dispersed P.B. 15:3): 10%

Aqueous pigment dispersion 6 (resin-dispersed P.R. 122): 12%

Aqueous pigment dispersion 7 (resin-dispersed P.Y. 74): 9%

<Criterion for Evaluation of Sedimentation>

AA: The viscosity increasing rate was less than 26%.

A: The viscosity increasing rate was in a range of not less than 26% to less than 29%.

B: The viscosity increasing rate was not less than 29%.

(b) Evaluation of Color of Liquid

The water-based ink of each of Examples 1 to 10 and Comparative examples 1 to 8 was diluted such that the solid content mass of the pigment became 0.002% by mass, the color measurement was performed using the spectrophotometer UV 3600, with a measuring cell having a cell length of 10 mm and pure water (purified water) as the reference, and thus the L* value, the a* value and b* value were obtained for the water-based ink of each of Examples 1 to 10 and Comparative examples 1 to 8. Each of the L* value, the a* value and b* value is based on the L*a*b color system (CIE 1976 (L*a*b*) color system) normalized in 1976 by Commission Internationale d'Eclairage (CIE) (see JIS Z 8729). From the a* value and b* value, the chromaticness C* was calculated by the following expression, and the evaluation was made based on the following criterion of the evaluation. Note that as appreciated from the following expression, the chromaticness C* corresponds to a distance, in the graph indicating a* and b* on a plane, to the origin (a*=0 and b*=0) from the position of the water-based ink of each of Examples 1 to 10 and Comparative examples 1 to 8; as the chromaticness C* of a water-based ink is smaller, it is possible to determine that the water-based ink is more preferred as an achromatic color water-based ink such as a water-based black ink, etc.

$$C^* = \{(a^{*2}) + (b^{*2})\}^{1/2}$$

<Criterion for Evaluation of Color of Liquid>

AA: C* was less than 10.

A: C* was in a range of not less than 10 to less than 20.

B: C* was not less than 20.

(b) Evaluation of Re-Dispersion Property

The water-based inks of Examples 1 to 10 and Comparative Examples 1 to 8 were each dripped in an amount of 12 μL onto glass slides, respectively. Subsequently, the glass slides were stored for duration of one day (overnight) under an environment of temperature: 80° C., and thus the water-based inks were evaporated to dryness with resultant solid matters, respectively. Next, 3 droplets of water were dripped, with a pipette or dropper, onto each of the stored solid matters generated due to the evaporation and dryness, and evaluations samples were prepared. Each of the evaluation samples prepared in such a manner was observed visually; and the re-dispersion property was evaluated for each of the evaluation samples based on the following evaluation criterion.

<Evaluation Criterion for Re-Dispersion Property>

AA: 100% of the solid matter, generated due to the evaporation to dryness, was re-dispersed upon dripping of water.

A: Less than 100% to not less than 70% of the solid matter, generated due to the evaporation to dryness, was re-dispersed upon dripping of water.

B: Less than 70% of the solid matter, generated due to the evaporation to dryness, was re-dispersed upon dripping of water.

The water-based ink composition and the results of evaluations of each of the water-based inks of Examples 1 to 10 and Comparative Examples 1 to 8 are indicated in TABLE 2. Note that in TABLE 2, "Bk:Col" indicates the ratio between the solid content mass (Bk) of the self-dispersible black pigment and the solid content mass (Col) of the resin-dispersed chromatic pigment.

TABLE 2

| | | EXAMPLES | | | | | |
|---|---|---|---|---|---|---|---|
| | | 1 | 2 | 3 | 4 | 5 | 6 |
| Water-based ink Composition (% by mass) | Aqueous pigment dispersion 1 (*1) | 3.75 | 3.75 | 3.75 | 3.75 | 3.75 | 7.00 |
| | Aqueous pigment dispersion 2 (*2) | — | — | — | — | — | — |
| | Aqueous pigment dispersion 3 (*3) | — | — | — | — | — | — |
| | Aqueous pigment dispersion 4 (*4) | — | — | — | — | — | — |
| | Aqueous pigment dispersion 5 (*5) | 0.30 | 0.42 | 0.60 | 0.78 | 0.90 | 0.90 |
| | Aqueous pigment dispersion 6 (*6) | 0.45 | 0.63 | 0.90 | 1.17 | 1.35 | 1.35 |
| | Aqueous pigment dispersion 7 (*7) | 0.15 | 0.21 | 0.30 | 0.39 | 0.45 | 0.45 |
| | Glycerol | 27.5 | 26.1 | 24.5 | 22.0 | 20.6 | 15.5 |
| | Triethylene glycol-n-butyl ether | 5.0 | 5.0 | 5.0 | 5.0 | 5.0 | 5.0 |
| | SUNNOL (trade name) NL1430 (*8) | 1.0 | 1.0 | 1.0 | 1.0 | 1.0 | 1.0 |
| | Water | balance | balance | balance | balance | balance | balance |
| | Bk:Col | 1:0.24 | 1:0.34 | 1:0.48 | 1:0.62 | 1:0.72 | 1:039 |
| | Evaluation of sedimentation | A | AA | AA | AA | A | A |
| | Evaluation of color of liquid | AA | AA | AA | AA | AA | AA |
| | Evaluation of re-dispersion property | AA | AA | AA | AA | AA | AA |

| | | EXAMPLES | | | | COMPARATIVE EXAMPLES | |
|---|---|---|---|---|---|---|---|
| | | 7 | 8 | 9 | 10 | 1 | 2 |
| Water-based ink Composition (% by mass) | Aqueous pigment dispersion 1 (*1) | 3.75 | 3.75 | 3.75 | 7.00 | 3.75 | 3.75 |
| | Aqueous pigment dispersion 2 (*2) | — | — | — | — | — | — |
| | Aqueous pigment dispersion 3 (*3) | — | — | — | — | — | — |
| | Aqueous pigment dispersion 4 (*4) | — | — | — | — | — | — |
| | Aqueous pigment dispersion 5 (*5) | 0.80 | 1.60 | 2.40 | 2.40 | — | 0.27 |
| | Aqueous pigment dispersion 6 (*6) | 0.11 | 0.22 | 0.33 | 0.33 | — | 0.41 |
| | Aqueous pigment dispersion 7 (*7) | — | — | — | — | — | 0.14 |
| | Glycerol | 27.7 | 24.7 | 20.5 | 27.7 | 29.1 | 28.0 |
| | Triethylene glycol-n-butyl ether | 5.0 | 5.0 | 5.0 | 5.0 | 5.0 | 5.0 |
| | SUNNOL (trade name) NL1430 (*8) | 1.0 | 1.0 | 1.0 | 1.0 | 1.0 | 1.0 |
| | Water | balance | balance | balance | balance | balance | balance |
| | Bk:Col | 1:0.24 | 1:0.49 | 1:0.73 | 1:0.39 | — | 1:0.22 |
| | Evaluation of sedimentation | A | AA | A | A | B | B |
| | Evaluation of color of liquid | AA | A | A | AA | AA | AA |
| | Evaluation of re-dispersion property | AA | AA | A | A | AA | AA |

TABLE 2-continued

|  |  | COMPARATIVE EXAMPLES | | | | | |
|---|---|---|---|---|---|---|---|
|  |  | 3 | 4 | 5 | 6 | 7 | 8 |
| Water-based ink Composition (% by mass) | Aqueous pigment dispersion 1 (*1) | 3.75 | 3.75 | 3.75 | 3.75 | 3.75 | 3.75 |
|  | Aqueous pigment dispersion 2 (*2) | — | 0.30 | — | — | 0.80 | — |
|  | Aqueous pigment dispersion 3 (*3) | — | 0.45 | — | — | 0.11 | — |
|  | Aqueous pigment dispersion 4 (*4) | — | 0.15 | — | — | — | — |
|  | Aqueous pigment dispersion 5 (*5) | 0.93 | — | 0.72 | 2.48 | — | — |
|  | Aqueous pigment dispersion 6 (*6) | 1.40 | — | 0.10 | 0.34 | — | 2.04 |
|  | Aqueous pigment dispersion 7 (*7) | 0.48 | — | — | — | — | — |
|  | Glycerol | 15.0 | 28.3 | 28.1 | 19.5 | 28.8 | 26.3 |
|  | Triethylene glycol-n-butyl ether | 5.0 | 5.0 | 5.0 | 5.0 | 5.0 | 5.0 |
|  | SUNNOL (trade name) NL1430 (*8) | 1.0 | 1.0 | 1.0 | 1.0 | 1.0 | 1.0 |
|  | Water | balance | balance | balance | balance | balance | balance |
|  | Bk:Col | 1:0.75 | — | 1:0.22 | 1:0.75 | — | 1:0.54 |
| Evaluation of sedimentation |  | B | B | B | B | B | AA |
| Evaluation of color of liquid |  | AA | AA | A | A | AA | B |
| Evaluation of re-dispersion property |  | AA | AA | AA | A | AA | AA |

LEGEND
(*1) Aqueous dispersion of self-dispersible black pigment; mean particle diameter: 155 nm; numeral in the table indicates solid content mass; density of pigment: 1.8 g/cm$^3$.
(*2) Aqueous dispersion of self-dispersible P.B. 15:3; mean particle diameter: 95 nm; numeral in the table indicates solid content mass.
(*3) Aqueous dispersion of self-dispersible P.R. 122; mean particle diameter: 120 nm; numeral in the table indicates solid content mass.
(*4) Aqueous dispersion of self-dispersible P.Y 74; mean particle diameter: 130 nm; numeral in the table indicates solid content mass.
(*5) Aqueous dispersion of P.B 15:3 (containing resin dispersant); mean particle diameter: 104 nm; numeral in the table indicates pigment solid content mass; density of pigment: 1.62 g/cm$^3$.
(*6) Aqueous dispersion of P.R 122 (containing resin dispersant); mean particle diameter: 125 nm; numeral in the table indicates pigment solid content mass; density of pigment: 1.5 g/cm$^3$.
(*7) Aqueous dispersion of P.Y 74 (containing resin dispersant); mean particle diameter: 105 nm; numeral in the table indicates pigment solid content mass; density of pigment: 1.3 g/cm$^3$.
(*8) Surfactant, manufactured by LION SPECIALTY CHEMICALS CO., LTD.; effective ingredient amount: 28% by weight; numeral in the table indicates the effective ingredient amount.

The unit in the water-based ink composition in TABLE 2: % by mass.

As indicated in TABLE 2, in Examples 1 to 10, the result of evaluation of sedimentation, the result of evaluation of color of liquid and the result of evaluation of re-dispersion property were satisfactory. In Examples 2 to 4 in each of which Bk:Col was in the range of Bk:Col=1:0.34 to 1:0.62, the result of evaluation of sedimentation was particularly excellent as compared with Example 1 in which Bk:Col was 1:0.24 and Example 5 in which Bk:Col was Bk:Col=1:0.72.

Further, Each of Examples 1 to 10 had a satisfactory result of the evaluation of color of liquid, namely, Each of Examples 1 to 10 had a small Chromaticness C. Comparative Example 1, which was a water-based ink containing only the self-dispersible black pigment, also had a small Chromaticness C* (had a satisfactory result of the evaluation of color of liquid). From these results, it was possible to confirm that the water-based inks of Examples 1 to 10 had a liquid color close to that of a water-based ink containing only the self-dispersible black pigment (namely, the water-based ink of Comparative Example 1).

On the other hand, the results of evaluation of sedimentation were unsatisfactory in Comparative Example 1 which did not use the resin-dispersed chromatic pigment, in Comparative Examples 2 and 5 in each of which Bk:Col was 1:0.22, in Comparative Examples 3 and 6 in each of which Bk:Col was 1:0.75, and in Comparative Examples 4 and 7 each of which used the self-dispersible chromatic pigment instead of using the resin-dispersed chromatic pigment. Further, the result of evaluation of liquid color was unsatisfactory in Comparative Example 8 which used only the resin-dispersed chromatic magenta pigment as the resin-dispersed chromatic pigment.

As described above, the water-based ink related to the present teaching is capable of suppressing the sedimentation of the self-dispersible black pigment, and has a liquid color close to that of a water-based ink containing only the self-dispersible black pigment. The applicability of the water-based ink related to the present teaching is not particularly limited, and is widely applicable to a variety of kinds of ink-jet recording.

What is claimed is:
1. A water-based ink for ink-jet recording comprising:
   a self-dispersible black pigment;
   a resin-dispersed chromatic pigment including a resin-dispersed magenta pigment and a resin-dispersed cyan pigment; and
   water,
   wherein a ratio (Col/Bk) of a solid content mass (Col) of the resin-dispersed chromatic pigment to a solid content mass (Bk) of the self-dispersible black pigment is in a range of 0.24 to 0.73;
   a mean particle diameter of the self-dispersible black pigment is greater than a mean particle diameter of the resin-dispersed chromatic pigment;

a hue angle of the resin-dispersed chromatic pigment is in a range of 180° to 270°; and a hue angle of the self-dispersible black pigment is in a range of no 90°.

2. The water-based ink for ink-jet recording according to claim 1, wherein the ratio (Col/Bk) of the solid content mass (Col) of the resin-dispersed chromatic pigment to the solid content mass (Bk) of the self-dispersible black pigment is in a range of 0.34 to 0.62.

3. The water-based ink for ink-jet recording according to claim 1, wherein the resin-dispersed chromatic pigment further includes a resin-dispersed yellow pigment.

4. The water-based ink for ink-jet recording according to claim 3, wherein the resin-dispersed yellow pigment is C.I. pigment yellow 74.

5. The water-based ink for ink-jet recording according to claim 1, wherein the resin-dispersed magenta pigment is C.I. pigment red 122; and the resin-dispersed cyan pigment is C.I. pigment blue 15:3.

6. The water-based ink for ink-jet recording according to claim 1, wherein the mean particle diameter of the self-dispersible black pigment is not less than 150 nm.

7. The water-based ink for ink-jet recording according to claim 1, wherein the self-dispersible black pigment is carbon black.

8. The water-based ink for ink-jet recording according to claim 1, wherein the mean particle diameter of the self-dispersible black pigment is in a range of 1.08 times to 1.49 times the mean particle diameter of the resin-dispersed chromatic pigment.

9. The water-based ink for ink-jet recording according to claim 1, wherein density of the self-dispersible black pigment is in a range of 1.11 times to 1.58 times density of the resin-dispersed chromatic pigment.

10. The water-based ink for ink-jet recording according to claim 1, wherein a ratio (C/M) of a solid content mass (C) of the resin-dispersed cyan pigment to a solid content mass (M) of the resin-dispersed magenta pigment is in a range of 5 to 10.

* * * * *

UNITED STATES PATENT AND TRADEMARK OFFICE
CERTIFICATE OF CORRECTION

| | |
|---|---|
| PATENT NO. | : 10,759,955 B2 |
| APPLICATION NO. | : 16/286214 |
| DATED | : September 1, 2020 |
| INVENTOR(S) | : Akihiko Taniguchi et al. |

It is certified that error appears in the above-identified patent and that said Letters Patent is hereby corrected as shown below:

In the Claims

Column 19, Claim 1, Line 4:
Please delete "no 90." and insert --0° to 90°.--

Signed and Sealed this
Third Day of May, 2022

*Katherine Kelly Vidal*

Katherine Kelly Vidal
*Director of the United States Patent and Trademark Office*